(12) United States Patent
Isogai et al.

(10) Patent No.: US 7,868,117 B2
(45) Date of Patent: Jan. 11, 2011

(54) RESIN COMPOSITION AND PRODUCTION METHOD THEREOF

(75) Inventors: Naohide Isogai, Aichi (JP); Takeshi Fujita, Aichi (JP); Yasuharu Yamada, Kanagawa (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 11/930,511

(22) Filed: Oct. 31, 2007

(65) Prior Publication Data

US 2008/0103241 A1 May 1, 2008

(30) Foreign Application Priority Data

Oct. 31, 2006 (JP) ............................. 2006-296960

(51) Int. Cl.
*C08G 77/04* (2006.01)
(52) U.S. Cl. ....................................... 528/26
(58) Field of Classification Search ................. 524/394; 528/26
See application file for complete search history.

(56) References Cited

U.S. PATENT DOCUMENTS 3,968,305 A * 7/1976 Oshima et al. .............. 428/334

2002/0098243 A1 7/2002 Edelmann et al.

FOREIGN PATENT DOCUMENTS

| EP | 0703192 A1 | | 3/1996 |
| JP | 2002-234906 | * | 8/2002 |
| JP | 2004-131702 A | | 4/2004 |
| JP | 2004-277512 A | | 10/2004 |

OTHER PUBLICATIONS

Machine translation of JP 2002-234906. Aug. 23, 2002.*
European Search Report issued on Sep. 7, 2010, in the corresponding European Patent Application No. 07021131.3.

* cited by examiner

*Primary Examiner*—Milton I Cano
*Assistant Examiner*—John Uselding
(74) *Attorney, Agent, or Firm*—Sughrue Mion, PLLC

(57) ABSTRACT

A resin composition comprising: a tri-functional or more (meth)acrylate having an alkoxysilyl group; and at least one of a metal oxide fine particle having a hydroxyl group on a surface thereof and a metalalkoxide, wherein the tri-functional or more (meth)acrylate having the alkoxysilyl group and the at least one of the metal oxide fine particle having the hydroxyl group on the surface thereof and the metal alkoxide covalently bind, and the production method thereof.

1 Claim, 1 Drawing Sheet

RESIN COMPOSITION AND PRODUCTION METHOD THEREOF

FIELD OF THE INVENTION

The invention relates to an acrylic resin composition in which inorganic fine particles are blended, and the production method thereof.

BACKGROUND OF THE INVENTION

A resin composition where, in order to improve the mechanical characteristics and the heat resistance of acryl resins such as polymethyl methacrylate (hereinafter, referred to as "PMMA"), inorganic fine particles are blended in a resin is known. As such resin composition, a resin composition where an acrylic polymer having an alkoxysilyl group and a metal alcolate are subjected to a sol-gel reaction to improve the mechanical characteristics is known (patent literature 1). Such the resin composition, when molded as optical members such as films or lenses, can be used as an optical member excellent in the mechanical characteristics.

[Patent literature 1] JP-A No. 2004-277512

SUMMARY OF THE INVENTION

The resin composition like this, when molded as mentioned above, can be used as optical members such as films or lenses, and, when coated on existing optical members (lenses or windows of vehicles), can be expected to impart a function as hardcoat. In general, the hardcoat can improve the mechanical characteristics such as the scratch resistance and the surface hardness. However, it is difficult for the hardcoat to improve both mechanical characteristics of the scratch resistance and the surface hardness simultaneously. Accordingly, a resin composition that can preferably improve both characteristics is in demand.

In view of problems of the existing technologies, the invention intends to provide a resin composition that can improve mechanical characteristics such as the scratch resistance and the surface hardness through a convenient method.

The present inventors, after studying hard, found that a resin composition that is obtained by reacting tri-functional or more (meth)acrylate having an alkoxysilyl group and at least one of metal oxide fine particles having a hydroxyl group on a surface thereof and a metal alkoxide can be conveniently synthesized and, while securing high transparency, can improve the mechanical characteristics such as the surface hardness and the scratch resistance.

On the contrary, a resin composition that is obtained by reacting (meth)acrylate having an alkoxysilyl group and metal oxide fine particles having a hydroxyl group on a surface thereof, when cured by heating, can be improved in the mechanical characteristics even when mono-functional or bi-functional (meth)acrylate having an alkoxysilyl group is used. However, when it is used as a hardcoat resin composition, since the resin composition is coated in many cases on materials weak to heat such as plastics, a coating solution is necessarily subjected to UV-curing to cure. However, it is found that a resin composition obtained by reacting monofunctional or bi-functional (meth)acrylate having an alkoxysilyl group and metal oxide fine particles having a hydroxyl group on a surface thereof is difficult to completely cure according to the UV-curing and a resin composition that is obtained by reacting tri-functional or more (meth) acrylate and at least one of metal oxide fine particles having a hydroxyl group on a surface thereof and metal alkoxide can be sufficiently polymerized and cured and used particularly preferably as a hardcoat resin composition.

The constitution of the present invention is set forth below.

1. A resin composition comprising: a tri-functional or more (meth)acrylate having an alkoxysilyl group; and at least one of a metal oxide fine particle having a hydroxyl group on a surface thereof and a metal alkoxide, wherein the tri-functional or more (meth)acrylate having the alkoxysilyl group and the at least one of the metal oxide fine particle having the hydroxyl group on the surface thereof and the metal alkoxide covalently bind.

2. The resin composition of the item 1, wherein a content of the at least one of the metal oxide fine particle having the hydroxyl group on the surface thereof and the metal alkoxide is 1.0 to 70% by weight, to an amount of mixture of the tri-functional or more (meth)acrylate having the alkoxysilyl group and the at least one of the metal oxide fine particle having the hydroxyl group on the surface thereof and the metal alkoxide.

3. The resin composition of the item 1 or 2, wherein the tri-functional or more (meth)acrylate having the alkoxysilyl group is obtained by mixing and polymerizing a tri-functional or more (meth)acrylic monomer, or oligomer or polymer thereof and a (meth)acrylic monomer having the alkoxysilyl group.

4. The resin composition of any one of the items 1 to 3, which is obtained by condensating the tri-functional or more (meth)acrylate having the alkoxysilyl group and the at least one of the metal oxide fine particle having the hydroxyl group on the surface thereof and the metal alkoxide.

5. The resin composition of any one of the items 1 to 4, which further comprises a photopolymerization initiator.

6. The resin composition of any one of the items 1 to 5, which is for a formation of hard coat.

7. A method of producing a resin composition, which comprising condensating a tri-functional or more (meth)acrylate having an alkoxysilyl group and at least one of a metal oxide fine particle having a hydroxyl group on a surface thereof and a metal alkoxide.

8. The method of the item 7, which further comprises mixing and polymerizing a tri-functional or more (meth) acrylic monomer, or oligomer or polymer thereof and a (meth)acrylic monomer having the alkoxysilyl group to obtain the tri-functional or more (meth)acrylate having the alkoxysilyl group.

DETAILED DESCRIPTION OF THE INVENTION

Figure 1:
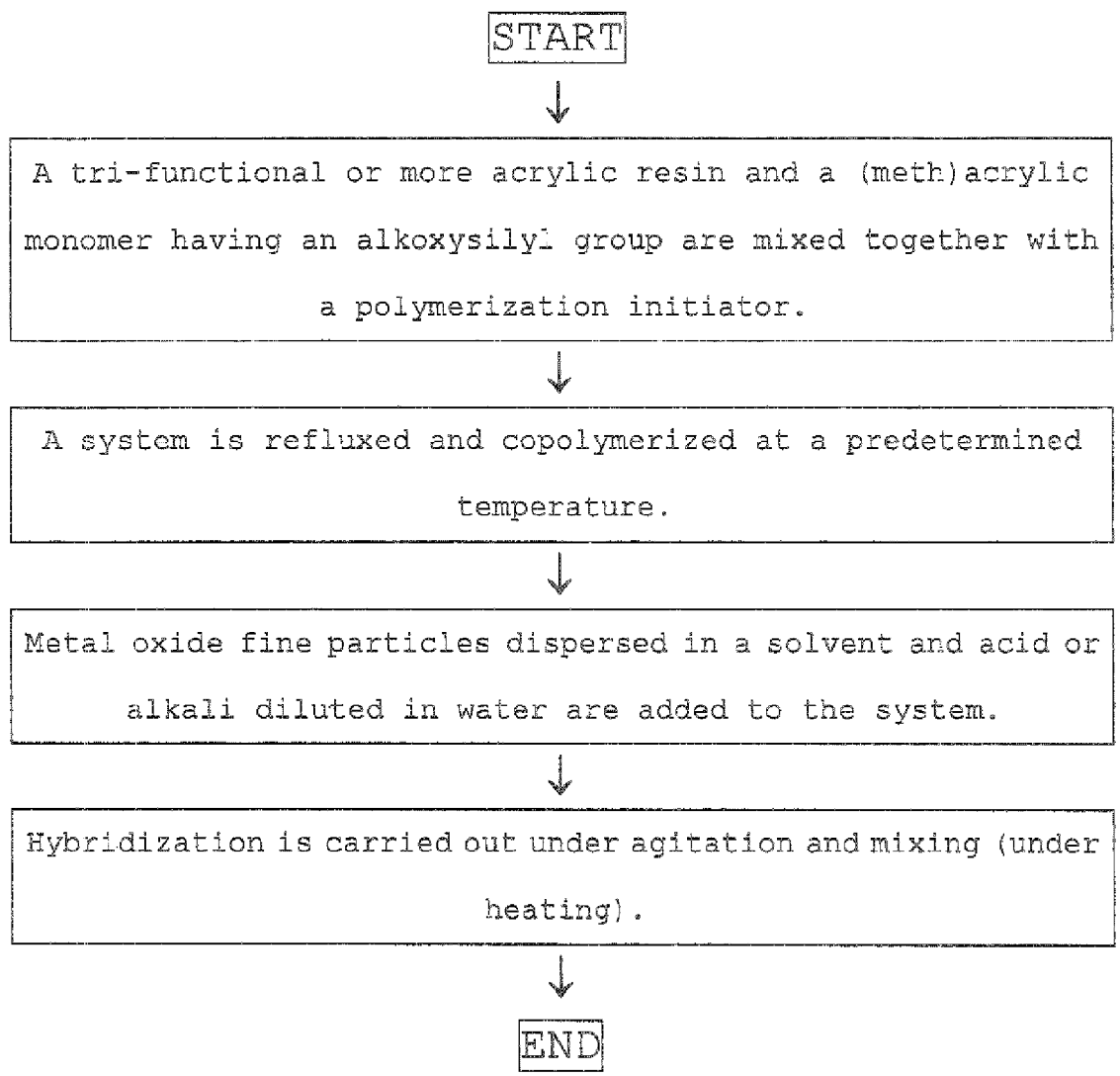
FIG. 1 is a flowchart showing a flow of a producing method of a resin composition involving an embodiment of the invention.

In the invention, tri-functional or more, preferably from tri-functional to hexa-functional (meth)acrylate having an alkoxysilyl group being used can be readily obtained by copolymerizing a tri-functional or more (meth) acrylic monomer, or oligomer or polymer thereof and a (meth)acrylic monomer having an alkoxysilyl group. Specifically, ones cited below can be used. Ones expressed by " . . . (meth)acrylate" express " . . . acrylate" or " . . . methacrylate".

Firstly, examples of tri-functional or more (meth) acrylic monomers (including oligomers and polymers thereof) include branched-chain and cyclic (meth)acrylates such as trimethylolpropane trimethacrylate, trimethylolpropane triacrylate, ethylene oxide modified trimethylolpropane triacrylate, pentaerythritol triacrylate, pentaerythritol tetraacrylate, dipentaerythritol hexaacrylate, tetramethylolmethane triacrylate, tetramethylolmethane tetraacrylate and tris(2-hydroxylethyl)isocyanulate triacrylate or urethane acrylates without restricting thereto. Furthermore, these can be used singularly or in a combination of at least two kinds thereof.

Furthermore, examples of (meth) acrylic monomers having an alkoxysilyl group include ones having a structure where an alkoxysilyl group and a (meth)acryl group in a molecule such as 3-methacryloxypropylmethyldimethoxysilane, 3-methacryloxypropyltrimethoxysilane, 3-methacryloxypropylmethyldiethoxysilane, 3-methacryloxypropyltriethoxysilane, vinyltriethoxysilane, vinyltrimethoxysilane, p-styryltrimethoxysilane, 3-acryloxypropyltriethoxysilane and vinyltriacetoxysilane.

Furthermore, examples of the metal oxide fine particles having a hydroxyl group to be used, include silica ($SiO_2$), alumina ($Al_2O_3$), zirconia ($ZrO_2$), titania ($TiO_2$), ITO (tin-doped indium oxide), tin oxide ($SnO_2$), zinc oxide ($ZnO$), antimony oxide ($Sb_2O_3$, $Sb_2O_5$ and so on), and composite fine particles thereof. The metal oxide fine particles like this have a hydroxyl group on a surface thereof.

Examples of the metal alkoxide include an alkoxide of a metal high in the reactivity such as silicon, titanium, zirconium or aluminum. The metal alkoxide can be added together with the metal oxide fine particles or can be used in place of the metal oxide fine particles.

A content of at least one of the metal oxide fine particles and the metal alkoxide is, relative to a mixed amount of the (meth)acrylic polymer having an alkoxysilyl group and at least one of the metal oxide fine particles and the metal alkoxide, preferably in the range of 1.0 to 70% by weight and more preferably in the range of 10 to 50% by weight. When the content of the metal oxide fine particles is less than 1.0% by weight, an advantage thereof can be obtained with difficulty. On the other hand, when the content exceeds 70% by weight, an obtained resin composition is likely to be brittle.

Examples of organic solvents that are used when a tri-functional or more (meth)acrylate and a (meth)acrylic monomer having an alkoxysilyl group are copolymerized, include methyl ethyl ketone, methyl isobutyl ketone, cyclohexanone, benzene, toluene, xylene, methyl cellosolve, ethyl cellosolve, n-propyl cellosolve, methanol, ethanol, isopropyl alcohol, n-butyl alcohol, isobutyl alcohol, methyl isobutyl ketone, propylene glycol monomethyl ether, ethyl acetate, propyl acetate, propylene glycol monomethyl ether, ethylene glycol diethyl ether, diethylene glycol dimethyl ether and combinations thereof.

Furthermore, examples of polymerization initiators for polymerizing (meth)acrylic monomers include general polymerization initiators such as peroxide type initiators such as benzoyl peroxide (BPO), t-butyl peroxy-2-ethyl hexanoate, 1,1-di-t-butylperoxy-2-methyl cyclohexane and cumene hydroperoxide and azo type initiators such as 2,2'-azobis-isobutyronitrile (AIBN) and 2,2'-azobis-2,4-dimetylvaleronitrile. An addition amount thereof is, to a total amount of acrylic resin, in the range of 0.1 to 10% by weight and preferably in the range of 0.5 to 5% by weight.

In the next place, a producing method of a resin composition of the invention will be described with reference to the drawings. FIG. 1 is a flowchart showing a flow of a producing method of a resin composition of the invention.

In the beginning, in order to obtain a tri-functional or more (meth)acrylate having an alkoxysilyl group ((meth)acrylic polymer), predetermined amounts of a tri-functional or more (meth)acrylic monomer, or oligomer or polymer thereof (hereinafter, referred to as tri-functional or more acrylic resin) and a (meth)acrylic monomer having an alkoxysilyl group are mixed to prepare a mixture.

A blending molar ratio of a tri-functional or more acryl resin and a (meth)acrylic monomer having an alkoxysilyl group is preferably in the range of 55:45 to 99:1 and more preferably substantially in the range of 70:30 to 90:10. When a ratio of the (meth) acrylic monomer having an alkoxysilyl group exceeds 45% by mole, the mixture becomes difficult to cure, that is, the hardness cannot be obtained. On the other hand, when the ratio of the (meth)acrylic monomer having an alkoxysilyl group is less than 1% by mole, an advantage of the inorganic material obtained when the tri-functional or more (meth)acrylate and the inorganic material are bonded later becomes difficult to obtain. A polymerization initiator and an organic solvent are added to the obtained mixture, followed by refluxing at 80° C. for 1 to 5 hr. Thereby, a tri-functional or more (meth)acrylate having an alkoxysilyl group can be obtained.

To the obtained tri-functional or more (meth)acrylate having an alkoxysilyl group, a predetermined amount of metal oxide fine particles having a hydroxyl group on a surface thereof and dispersed in an organic solvent is added. In order to promote a condensation reaction between the alkoxysilyl group and the metal oxide fine particles, water-diluted acid or alkali is added followed by agitating for a predetermined time. Thereby, a target resin composition where an acrylic polymer and metal oxide fine particles covalently bind, can be obtained. In order to promote the reaction, the system may be heated. Even when metal alkoxide is used in place of the metal oxide fine particles, according to a procedure similar to the above, a target resin composition can be obtained.

Furthermore, in the case of a resin composition of the embodiment being stored in liquid for a predetermined time period, a polymerization reaction due to the polymerization initiator may well be stooped in mid-course. A resin composition stored in liquid can be used for hardcoat as well. When the resin composition of the embodiment is handled in liquid, in order to polymerize and cure after that, a photopolymerization initiator is being added. Examples of such the photopolymerization initiators include benzoin methyl ether, benzoin ethyl ether, benzoin isopropyl ether, benzoin butyl ether, diethoxyacetophenone, benzyl dimethyl ketal, 2-hydroxy-2-methylpropiophenone, 1-hydroxycyclohexylphenyl ketone, benzophenone, 2,4,6-trimethylbenzoin diphenyl phosphine oxide, N,N-dimethylaminobenzoate isoamyl, 2-benzyl-2-dimethylamino-1-(4-morpholinophenyl)-butane-1-o ne and 2,4-diethylthioxanthone. These may be used in a combination of at least two kinds thereof. An addition amount to the acryl resin is 5% by weight or less and preferably in the range of 1 to 3% by weight.

When the resin composition is handled in liquid, the content of solvent is preferably 30 to 90% by weight, more preferably 50 to 80% by weight based on the total weight of the resin composition.

The resin composition of the invention is simple in the producing process and can be produced cheaply. When the resin composition is coated on a surface of an optical member by means of a spin coat method, spray coat method, dip coat method, bar coat method, flow coat method, cap coat method, knife coat method, die coat method, roll coat method or gravure coat method by a predetermined thickness and cured thereafter, a coating process that has an advantage of improving the surface hardness and scratch resistance can be applied. When the resin composition is coated on a substrate according to the coating method, followed by drying a solvent and illuminating UV-ray, a film can be obtained. At this time, a film thickness is set in the range of 1 to 50 μm and preferably in the range of 1 to 20 μm. In the UV-illumination, UV-ray emitted from a light source such as a low-pressure mercury lamp, a high-pressure mercury lamp, an ultrahigh pressure mercury lamp, an electrodeless lamp, a xenon lamp, a metal halide lamp, carbon arc tube, an LED lamp or a tungsten lamp is illuminated to cure to obtain a film. Furthermore, when an injection molding machine or an extrusion molding machine is used, a film-like or sheet-like resin composition (resin molded matter) excellent in the mechanical characteristics can be obtained. In particular, such the composition can be preferably used for optical use.

According to the resin composition of the invention, both mechanical characteristics of the scratch resistance and surface hardness can be improved.

In the next place, with reference to examples and comparative examples, the invention will be described. However, the invention is not restricted thereto.

EXAMPLE 1

A four-mouth flask was provided with a thermometer, a reflux tube and an agitation blade, the inside of the flask was substituted by nitrogen, followed by adding methyl ethyl ketone (MEK) (added twice a volume of monomer) and 5% by weight to a total amount of acrylic resin of benzoyl peroxide (BPO) that is a polymerization initiator. In the next place, 17 g of pentaerythritol acrylate (PE3A) (produced by Kyoei Kagaku K. K.) and vinyltriethoxysilane (VTS) (trade name: TSL8311, produced by Toshiba Silicone K. K.) was added at a molar ratio of 3:1, followed by agitating at a speed of 130 rpm, and thereby a homogeneous solution was obtained. Thereafter, while agitating, the solution was allowed to react at 80° C. for 1 hr in an oil bath. When a reaction came to completion, the dynamic viscosity was measured and found to be 3.7 mm$^2$/s and a solution was turbid in whitish yellow.

To 51 g of above-synthesized PE3A-VTS copolymer solution, 20 g of colloidal silica dispersed in MEK (trade name: MEK-ST, solid content SiO$_2$ (average particle diameter: 10 to 15 μm) 30% and MEK: 70%, produced by Nissan Chemical Industries Ltd.) and 0.3 g of 0.01 N hydrochloric acid were added, followed by agitating for 6 hr.

To the obtained PE3A-VTS copolymer-silica resin composition, 3% by weight to acryl resin of Irgacure 184 (trade name, produced by Ciba Specialty Chemicals Inc.,) as a photopolymerization initiator was added, followed by spin coating on a commercially available acryl plate (trade name: Acrylite L, produced by Mitsubishi Rayon Co., Ltd.) at 1000 rpm for 20 sec, further followed by drying at 65° C. for 1 min, still further followed by illuminating UV-ray at 1000 mJ/cm$^2$ from a high-pressure mercury lamp at a position 10 cm below a light source, and thereby a film was formed. Of the coated film, the transmittance, film thickness, mechanical characteristics (pencil hardness and scratch resistance), adhesiveness and appearance were measured according to methods below.

(1) Measurement of transmittance and film thickness: By use of a spectral photometer (trade name: HITACHI200-10, produced by Hitachi Ltd.), the transmittance and a film thickness in a predetermined region (380 to 780 nm) of the obtained film-like resin composition were obtained.

(2) Measurement of mechanical characteristics: The pencil hardness (surface hardness) on a film surface of the obtained resin composition was measured by use of a pencil hardness tester (produced by Imoto Seisakusho K. K.) in accordance with JIS K-5400. Furthermore, the scratch resistance due to steel wool was evaluated by the number of lines of scratch when the film surface was rubbed 10 times of reciprocations under the load of 1.5 kg.

(3) Adhesiveness test: The adhesiveness of the coated film was tested in accordance with JIS K-5400.

(4) Appearance: The appearance was visually evaluated.

(5) Measurement of dynamic viscosity: The dynamic viscosity was measured at 25° C. by use of a vibration viscometer (trade name: OVC-1, produced by Malcom Co., Ltd.). Results thereof are shown in Table 1.

EXAMPLE 2

Except that acryl resins added were changed to PE3A and methacryloxypropyltrimethoxysilane (MPS) (trade name: KMB503, produced by Shin-Etsu Chemical Co., Ltd.) and 17 g thereof was added at the molar ratio of 3:1, an operation was carried out similarly to example 1, and thereby a PE3A-MPS copolymer-silica resin composition was obtained. Thereto, 3% by weight to an acryl resin of a photopolymerization initiator Irgacure 184 was added and a coating solution was obtained. The coating solution was coated on an acryl plate similarly to example 1 to form a film, followed by evaluating. Results thereof are shown in Table 1.

EXAMPLE 3

Under the conditions similar to example 1, a PE3A-VTS copolymer was obtained. Thereto, 7 g of colloidal silica dispersed in MEK and 0.3 g of 0.01 N hydrochloric acid were added, followed by agitating at room temperature for 6 hr, further followed by adding 3% by weight to an acryl resin of a photopolymerization initiator Irgacure 184, and thereby a coating solution was obtained.

This was coated on an acryl plate similarly to example 1 to form a film, followed by evaluating. Results thereof are shown in Table 1.

EXAMPLE 4

Under the conditions similar to example 1, a PE3A-VTS copolymer was obtained. Thereto, 55 g of colloidal silica dispersed in MEK and 0.3 g of 0.01 N hydrochloric acid were added, followed by agitating at room temperature for 6 hr, further followed by adding 3% by weight to an acryl resin of a photopolymerization initiator Irgacure 184, and thereby a coating solution was obtained.

This was coated on an acryl plate similarly to example 1 to form a film, followed by evaluating. Results thereof are shown in Table 1.

EXAMPLE 5

Similarly to example 1, an acryl resin added was changed to pentaerythritol tetraacrylate (PE4A) (produced by Kyoeisha Kagaku K. K.) and MPS, 17 g thereof was added at the molar ratio of 3:1, an amount of MEK added was set at three-times by volume and an operation was carried out by refluxing at 80° C. for 1.5 hr. After that, an operation was carried out similarly to example 1 and thereby a PE4A-MPS copolymer-silica resin composition was obtained. Thereto, 3% by weight to an acryl resin of a photopolymerization initiator Irgacure 184 was added and a coating solution was obtained. The coating solution was coated on an acryl plate similarly to example 1 to form a film, followed by evaluating. Results thereof are shown in Table 1.

EXAMPLE 6

Similarly to example 1, an acryl resin added was changed to dipentaerythritol hexaacrylate (DPE6A) (produced by Kyoeisha Kagaku K. K.) and MPS and 17 g thereof was added at the molar ratio of 3:1. Furthermore, an amount of MEK added was changed to five-times a volume of the monomer and an operation was carried out by refluxing at 80° C. for 5 hr. After that, an operation was carried out similarly to example 1 and thereby a DPE6A-MPS copolymer-silica resin composition was obtained. Thereto, 3% by weight to an acryl resin of a photopolymerization initiator Irgacure 184 was added and a coating solution was obtained. The coating solution was coated on an acryl plate similarly to example 1 to form a film, followed by evaluating. Results thereof are shown in Table 1.

EXAMPLE 7

Similarly to example 2, with a molar ratio of PE3A and MPS set at 7:3, a PE3A-MPS copolymer was obtained. Thereto, 40 g of colloidal silica dispersed in MEK and 0.3 g of 0.01 N hydrochloric acid were added, followed by agitating at room temperature for 6 hr, further followed by adding 3% by weight to an acryl resin of a photopolymerization initiator Irgacure 184, and thereby a coating solution was obtained. This was coated on an acryl plate similarly to example 1 to form a film, followed by evaluating. Results thereof are shown in Table 1.

EXAMPLE 8

Similarly to example 2, with a molar ratio of PE3A and MPS set at 9:1, a PE3A-MPS copolymer was obtained. Thereto, 20 g of colloidal silica dispersed in MEK and 0.3 g of 0.01 N hydrochloric acid were added, followed by agitating at room temperature for 6 hr, further followed by adding 3% by weight to an acryl resin of a photopolymerization initiator Irgacure 184, and thereby a coating solution was obtained. This was coated on an acryl plate similarly to example 1 to form a film, followed by evaluating. Results thereof are shown in Table 1.

COMPARATIVE EXAMPLE 1

A substrate without hardcoat was evaluated with an acryl plate (trade name: Acrylite L, produced by Mitsubishi Rayon Co., Ltd.). Results thereof are shown in Table 2.

COMPARATIVE EXAMPLE 2

In the next place, 17 g of PE3A was dissolved in 34 g of MEK, followed by adding 3% by weight to an acryl plate of a photopolymerization initiator Irgacure 184 to prepare a coating solution. This was coated on an acryl plate similarly to example 1 to form a film, followed by evaluating. Results thereof are shown in Table 2.

COMPARATIVE EXAMPLE 3

After 17 g of PE3A and MPS was mixed at a molar ratio of 3:1 and diluted in MEK of an amount twice a volume of the monomer, without copolymerizing, 20 g of colloidal silica dispersed in MEK and 0.3 g of 0.01 N hydrochloric acid were added followed by agitating at room temperature for 6 hr and 3% by weight to an acryl resin of a photopolymerization initiator Irgacure 184 was added to prepare a coating solution. This was coated on an acryl plate similarly to example 1 to form a film, followed by evaluating. Results thereof are shown in Table 2.

COMPARATIVE EXAMPLE 4

Similarly to example 1, aPE3A-VTS copolymer was obtained. Thereto, 140 g of colloidal silica dispersed in MEK and 0.3 g of 0.01 N hydrochloric acid were added followed by agitating at room temperature for 6 hr and 3% by weight to an acryl resin of a photopolymerization initiator Irgacure 184 was added to prepare a coating solution. This was coated on an acryl plate similarly to example 1 to form a film, followed

TABLE 1

|  | Example 1 | Example 2 | Example 3 | Example 4 | Example 5 | Example 6 | Example 7 | Example 8 |
|---|---|---|---|---|---|---|---|---|
| 1) PE3A | 3.0 | 3.0 | 3.0 | 3.0 | — | — | 7.0 | 9.0 |
| 1) PE4A | — | — | — | — | 3.0 | — | — | — |
| 1) DPE6A | — | — | — | — | — | 3.0 | — | — |
| 1) VTS | 1.0 | — | 1.0 | 1.0 | — | — | — | — |
| 1) MPS | — | 1.0 | — | — | 1.0 | 1.0 | 3.0 | 1.0 |
| 2) | yes | yes | yes | yes | yes | Yes | yes | Yes |
| 3) | 3.7 | 2.9 | 3.7 | 3.7 | 3.2 | 4.0 | 2.8 | 3.0 |
| 4) | 23.8 | 23.8 | 29.5 | 16.0 | 19.3 | 13.9 | 18.6 | 23.8 |
| 5) | 8.5 | 8.5 | 3.6 | 15.6 | 6.8 | 4.9 | 13.1 | 8.5 |
| 6) | OK | OK | OK | OK | OK | OK | OK | OK |
| 7) | 7.2 | 6.0 | 9.3 | 5.5 | 5.2 | 6.0 | 6.4 | 6.1 |
| 8) | 92.1 | 92.1 | 92.2 | 92.1 | 92.0 | 92.0 | 92.3 | 92.2 |
| 9) | 100/100 | 100/100 | 100/100 | 100/100 | 100/100 | 100/100 | 100/100 | 100/100 |
| 10) | 6H | 6H | 6H | 6H | 6H | 6H | 6H | 6H |
| 11) | 0 line | 0 line | 0 line | 0 line | 0 line | 0 line | 0 line | 0 line |

1) Acrylic resin/ratio
2) Copolymerization reaction of acrylic resin
3) Dynamic viscosity after copolymerization (mm$^2$/s)
4) Content of acrylic resin (%)
5) Content of silica (%)
6) Appearance
7) Film thickness (μm)
8) Transmittance (%)
9) Adhesiveness
10) Pencil hardness
11) Scratch resistance by evaluating. Cracks were caused, resulting in appearance defect. Results thereof are shown in Table 2.

COMPARATIVE EXAMPLE 5

Similarly to example 1, 17 g of PE3A and VTS was copolymerized at a molar ratio of 3:1 in MEK. Thereto, 3% by weight to an acryl resin of a photopolymerization initiator Irgacure 184 was added to prepare a coating solution. This was coated on an acryl plate similarly to example 1 to form a film, followed by evaluating. Results thereof are shown in Table 2.

COMPARATIVE EXAMPLE 6

Similarly to example 1, 17 g of PE3A and VTS was copolymerized at a molar ratio of 1:1 in MEK. Thereto, 20 g of colloidal silica dispersed in MEK and 0.3 g of 0.01 N hydrochloric acid were added followed by agitating at room temperature for 6 hr and 3% by weight to an acryl resin of a photopolymerization initiator Irgacure 184 was added thereto to prepare a coating solution. This was coated on an acryl plate similarly to example 1 to form a film, followed by evaluating. Results thereof are shown in Table 2.

COMPARATIVE EXAMPLE 7

Similarly to example 1, 17 g of methyl methacrylate (trade name: Light-ester M, produced by Kyoeisha Kagaku K. K.) and VTS was copolymerized at a molar ratio of 3:1 in MEK. Thereto, 20 g of colloidal silica dispersed in MEK and 0.3 g of 0.01 N hydrochloric acid were added followed by agitating at room temperature for 6 hr and 3% by weight to an acryl resin of a photopolymerization initiator Irgacure 184 was added thereto to prepare a coating solution. Although this was coated on an acryl plate similarly to example 1 to form a film, it could not be sufficiently cured. Results thereof are shown in Table 2.

COMPARATIVE EXAMPLE 8

Similarly to example 1, 17 g of glycerin dimethyl methacrylate (trade name: G101P, produced by Kyoeisha Kagaku K. K.) and VTS was copolymerized at a molar ratio of 3:1 in MEK. Thereto, 20 g of colloidal silica dispersed in MEK and 0.3 g of 0.01 N hydrochloric acid were added followed by agitating at room temperature for 6 hr and 3% by weight to an acryl resin of a photopolymerization initiator Irgacure 184 was added to prepare a coating solution. Although this was coated on an acryl plate similarly to example 1 to form a film, it could not be sufficiently cured. Results thereof are shown in Table 2.

TABLE 2

|  | 12) | 13) | 14) | 15) | 16) | 17) | 18) | 19) |
|---|---|---|---|---|---|---|---|---|
| 1) PE3A | — | — | 3.0 | 3.0 | 3.0 | 1.0 | — | — |
| 1) MMA | — | — | — | — | — | — | 3.0 | — |
| 1) G101P | — | — | — | — | — | — | — | 3.0 |
| 1) VTS | — | — | — | 1.0 | 1.0 | — | 1.0 | 1.0 |
| 1) MPS | — | — | 1.0 | — | — | 1.0 | — | — |
| 2) | No | no | no | yes | yes | yes | Yes | Yes |
| 3) | — | — | 0.8 | 3.7 | 3.7 | 2.0 | 2.2 | 2.0 |
| 4) | — | 33.3 | 23.8 | 8.9 | 33.3 | 23.8 | 23.8 | 23.8 |
| 5) | — | — | 8.5 | 22.0 | 0.0 | 8.5 | 8.5 | 8.5 |
| 6) | — | OK | OK | Crack | OK | OK | Not cured | Not cured |
| 7) | — | 5.0 | 2.4 | 4.8 | 9.4 | 2.5 | — | — |
| 8) | 92.2 | 92.1 | 92.2 | 92.1 | 92.1 | 92.0 | — | — |
| 9) | — | 100/100 | 100/100 | 30/100 | 100/100 | 0/100 | — | — |
| 10) | 3-4H | 4H | 4H | 6H | 5H | 5H | — | — |
| 11) | 20 lines or more | 0 line | 10 lines | 2 lines | 0 line | 7 line | — | — |

1) Acrylic resin/ratio
2) Copolymerization reaction of acrylic resin
3) Dynamic viscosity after copolymerization ($mm^2/s$)
4) Content of acrylic resin (%)
5) Content of silica (%)
6) Appearance
7) Film thickness (μm)
8) Transmittance (%)
9) Adhesiveness
10) Pencil hardness
11) Scratch resistance
12) Comparative example 1
13) Comparative example 2
14) Comparative example 3
15) Comparative example 4
16) Comparative example 5
17) Comparative example 6
18) Comparative example 7
19) Comparative example 8

Results

As shown in Tables 1 and 2, it was confirmed that resin compositions of examples 1 through 8, in comparison with acrylic resin compositions obtained in comparative examples 1 through 8, while securing high transparency, were improved in both the scratch resistance and the surface hardness.

This application is based on Japanese patent application JP 2006-296960, filed on Oct. 31, 2006, the entire content of which is hereby incorporated by reference, the same as if set forth at length.

What is claimed is:

1. A method of producing a liquid resin composition for a hard coat, comprising a first step of copolymerizing a tri-functional or higher (meth)acrylic monomer, or oligomer or polymer thereof with a monomer having an alkoxysilyl group, using a polymerization initator, to obtain a tri-functional or higher (meth)acrylate having an alkoxysilyl group, in which the monomer having an alkoxysilyl group is selected from the group consisting of 3-methacryloxypropylmethyldimethoxysilane, 3-methacryloxypropyltrimethoxysilane, 3-methacryloxypropylmethyldiethoxysilane, 3-methacryloxypropyltriethoxysilane, vinyltriethoxysilane, vinyltrimethoxysilane, p-styryltrimethoxysilane, 3-acryloxypropyltriethoxysilane, and vinyltriacetoxysilane;

a second step of condensating the tri-functional or higher (meth)acrylate having an alkoxysilyl group as obtained in the first step and a metal oxide fine particle having a hydroxyl group on a surface thereof; and a third step of adding a photopolymerization initiator to a solution in which the tri-functional or higher (meth)acrylate having the alkoxysilyl group and the metal oxide find particle having the hydroxyl group on the surface thereof bind by a condensation reaction.

* * * * *